United States Patent
Chen et al.

(10) Patent No.: US 8,578,279 B2
(45) Date of Patent: Nov. 5, 2013

(54) ADAPTIVE INFOTAINMENT DEVICE

(75) Inventors: Meng-Cheng Chen, Taipei (TW); Jeng-Chun Chen, Taipei (TW); Wei-Hao Syu, Taipei (TW); Shu-Fen Shih, Hsinchu (TW); An-Jye Huang, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 481 days.

(21) Appl. No.: 12/826,812

(22) Filed: Jun. 30, 2010

(65) Prior Publication Data
US 2010/0332995 A1 Dec. 30, 2010

(30) Foreign Application Priority Data
Jun. 30, 2009 (TW) .............................. 98122107 A

(51) Int. Cl.
*G06F 3/00* (2006.01)
(52) U.S. Cl.
USPC ......................................................... 715/745
(58) Field of Classification Search
USPC ................................................. 715/751, 745
See application file for complete search history.

(56) References Cited

U.S. PATENT DOCUMENTS

| | | | |
|---|---|---|---|
| 6,434,621 B1 * | 8/2002 | Pezzillo et al. | 709/231 |
| 7,657,907 B2 * | 2/2010 | Fennan et al. | 725/46 |
| 7,937,380 B2 * | 5/2011 | Spiegelman et al. | 707/705 |
| 2003/0229900 A1 * | 12/2003 | Reisman | 725/87 |
| 2009/0064240 A1 * | 3/2009 | White | 725/87 |

* cited by examiner

*Primary Examiner* — Stephen Hong
*Assistant Examiner* — James G Pohlman
(74) *Attorney, Agent, or Firm* — WPAT, PC; Justin King

(57) ABSTRACT

The present invention provides an adaptive infotainment device, comprising a display unit, a processing module, and a network module. The processing module is coupled to the display unit to decrypt and process the multi-media content. The network module is coupled to the processing module to receive the multi-media content and selecting paths and accessing nodes. The network module collects the usage log to be processed by the processing module to generate an accumulated user profile to be fused with user default information in a user default unit coupled to the processing module to generate at least one threshold value so that the display unit is capable of displaying the processed multi-media content according to the threshold value. Hence, the user's network behavior can be learned by combining the pre-determined preferences and the past usage preferences so as to generate the most favorable displaying means to enhance the convenience for browsing information.

10 Claims, 3 Drawing Sheets

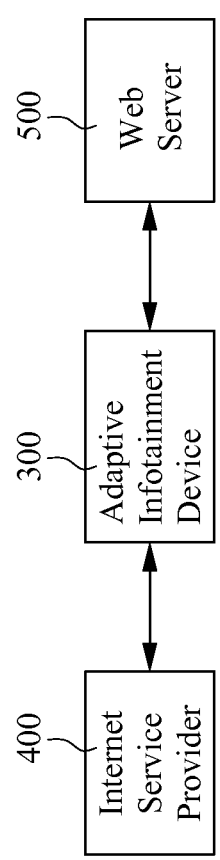

ADAPTIVE INFOTAINMENT DEVICE

BACKGROUND OF THE INVENTION

1. Field of the Invention

The present invention generally relates to an adaptive infotainment device and, more particularly, to an adaptive infotainment device that is capable of learning user network behaviors and adapting preference settings according thereto.

2. Description of the Prior Art

Internet-linked display systems, purely accessing data using the Internet or providing videos on-demand from network service providers, merely allow the user to make selections by directly inputting the uniform resource locator (URL) or (the program title of) the program channel. Since the Internet data or the programs provided from the network service providers are diverse and the users often have preferences for specific programs, it is important to allow the user to acquire information by pre-setting his/her preferred timings and program contents. However, the pre-set preference settings are not unalterable. Instead, the pre-set preference settings can be changed at anytime according to some specific occasions. For example, an information exhibition can be one specific occasion. The user thus can purchase new products according to the recently updated information. As a matter of fact, the technology-based information would be much more preferred than the pre-set entertainment news. Therefore, the pre-set preference settings have to be randomly adapted according to specific occasions to meet the user's demands at anytime.

In view of the above, the user conventionally accesses such information transmitted from the network service provider's server through the Internet corresponding to the player software or programs installed in the computer according to the user preference settings. However, it requires some steps such as boosting up the computer, verifying the ID and password, linking to the Internet, starting up the browser and browsing the pages before accessing the information or services. Such the foregoing approaches are not convenient for the user, and it fails to provide the user with real-time updated preference settings.

Therefore, there is need in providing an adaptive infotainment device capable of learning user's network behaviors and adapting preference settings according thereto so as to make it more convenient for the user to browse the data on the Internet.

SUMMARY OF THE INVENTION

It is one object of the present invention to provide an adaptive infotainment device capable of learning user's network behaviors and fusing a default preference with a past preference to arrange the most desirable manner of displaying updated information so as to make it more convenient for the user to browse the data on the Internet.

In order to achieve the foregoing object, the present invention provides an adaptive infotainment device, comprising: a display unit; a processing module coupled to the display unit to decrypt and process at least one multi-media content; and a network module coupled to the processing module to receive the multi-media content and capable of selecting paths and accessing nodes; wherein the network module collects at least one usage log to be processed by the processing module to generate an accumulated user profile to be fused with user default information in a user default unit coupled to the processing module to generate at least one threshold value so that the display unit is capable of displaying the processed multi-media content according to the threshold value.

Preferably, the display unit is a liquid crystal display.

Preferably, the processing module is a digital signal processor.

Preferably, the network module collects the usage log using at least one antenna unit.

Preferably, the usage log is stored in a usage log register.

Preferably, the accumulated user profile is stored in a log calculation unit, and the accumulated user profile is stored according to a pre-determined time slot.

Preferably, the adaptive infotainment device further comprises a reading medium for storing a plurality of widgets.

Preferably, the plurality of widgets are capable of playing the multi-media content on the liquid crystal display.

Preferably, the processing module fuses the accumulated user profile and the user default information according to a data fusion algorithm.

Preferably, the routing node module collects at least one usage log to be processed by the digital signal processor to generate an accumulated user profile to be fused with user default information in a user default unit coupled to the digital signal processor to set a plurality of widgets preset in a reading medium by providing different weights so that the liquid crystal display is capable of displaying the multi-media content played by the plurality of widgets.

Preferably, the routing node module collects, using an antenna, at least one usage log to be processed by the digital signal processor to generate an accumulated user profile, and the accumulated user profile is given by a weighted value which equals or is greater than the user default information in the user default unit coupled to the digital signal processor for serving fusion purpose so as to set the plurality of widgets predetermined in the module so that the liquid crystal display is capable of displaying the multi-media content played by the plurality of widgets within a time slot.

The present invention further provides an adaptive infotainment device, comprising: a digital signal processing module capable of processing multi-media data; a network module coupled to the digital signal processing module and linked to the Internet to receive the multi-media data; a display unit coupled to the digital signal processing module; a usage log unit coupled to the network module to store at least one usage log; a log calculation unit coupled to the usage log unit and the digital signal processing module to collect and calculate the usage log to generate an default information within a time slot; and a user default unit enabling the display unit to display the multi-media data according to user default information stored therein and the default information within a time slot fused by the digital signal processing module.

Preferably, the usage log is stored at a network service provider end or a user end.

Preferably, the display unit further comprises a user's interface to input the user default information.

Preferably, a proxy server is installed in the network module to be linked to the Internet.

Preferably, the usage log unit stores the usage log according to a predetermined time slot.

Preferably, the predetermined time slot utilizes at least two days as the basis.

Preferably, the display unit is a liquid crystal display.

Preferably, the network module collects the usage log contained in signals using at least one antenna unit.

Accordingly, in the present invention, the adaptive infotainment device is capable of learning user's network behaviors and fusing a default preference with a past preference settings to arrange the most desirable manner of displaying updated information so as to make it more convenient for the user to browse the data on the Internet.

BRIEF DESCRIPTION OF THE DRAWINGS

The objects, spirits and advantages of the embodiments of the present invention will be readily understood by the accompanying drawings and detailed descriptions, wherein:

FIG. 3 is a system diagram showing an adaptive infotainment device linked to the Internet to collect user network behavior and usage log according to the present invention.

DETAILED DESCRIPTION OF THE PREFERRED EMBODIMENT

The present invention can be exemplified by the embodiments as described hereinafter.

Figure 1:
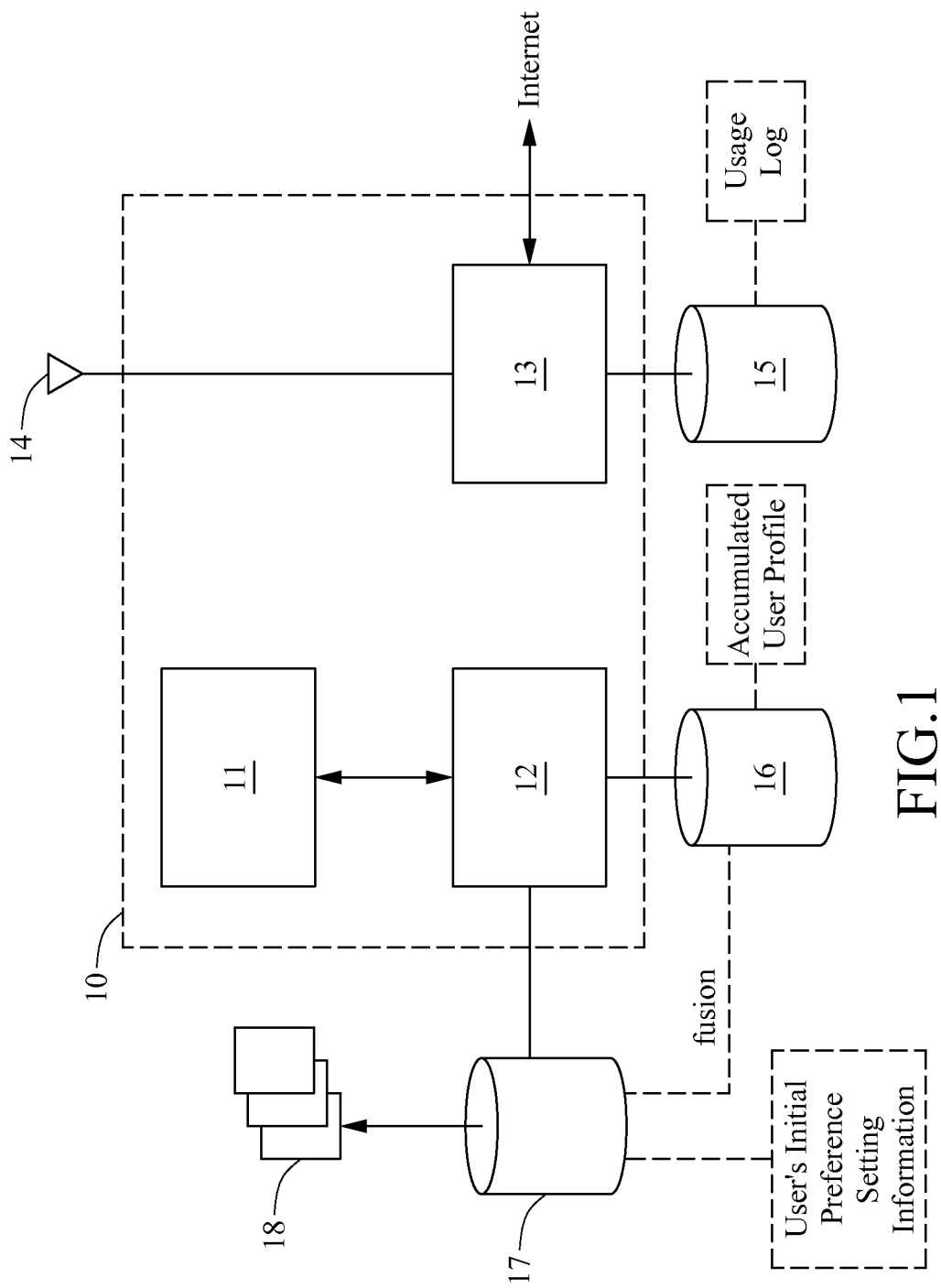
FIG. 1 is a system diagram according to one embodiment of the present invention.

FIG. 1 is a system diagram according to one embodiment of the present invention. In FIG. 1, an adaptive infotainment device 10 comprises a liquid crystal display 11, a digital signal processor 12 and a routing node module 13.

The routing node module 13 is linked to the Internet through at least one antenna 14 to access browsed specific information so as to collect at least one usage log. The method for collecting the usage log is well known in the art and thus is not presented herein. The usage log comprises information related to the accessed objects and user attributes, for example the access time and/or the number of accessed objects, is stored. The usage log is registered in a usage log register 15, preferably a memory, by the routing node module 13. Moreover, the usage log is continuously updated upon at least every two days as a predetermined time slot for further comparison. However, the time slot is not limited thereto. To avoid overloading, the time slot is no longer than five days. Meanwhile, the routing node module 13 receives at least one multi-media content.

The digital signal processor 12 is coupled to the routing node module 13 and is provided with hardware decryption to process the multi-media content. Moreover, the usage log is fetched from the usage log register 15 and processed to produce an accumulated user profile that then is stored in a usage log database 16. The accumulated user profile is calculated according to a pre-set time slot at the user's end. The time slot is determined according to the preference settings at the user's end at anytime so as to accumulate the user profile. For example, it can be determined that weather reports, daily news and traffic information updates are browsed during the breakfast hours from six to eight in the morning while entertainment news reports on TV shows, music and sports are browsed from eight to ten in the evening. Such user profiles in certain time slots are accumulated as a history data regarded as a user default.

The digital signal processor 12 is further coupled to a user default unit 17 that comprises user default information input from a touch user interface (not shown) on the liquid crystal display 11. Therefore, the user default information and the accumulated user profile are fused by a data fusion process. In the present invention, the data fusion process provides the user default information and the accumulated user profile with respective weights for setting a plurality of widgets stored in a reading medium for the adaptive infotainment device 10. The digital signal processor 12 fuses the accumulated user profile and the user default information according to data fusion algorithm. The data fusion algorithm applied to the data fusion process is performed according to the dynamic weight. Moreover, the adaptive infotainment device 10 can obtain the weights for the accumulated user profile and the user default information according to fuzzy regression. The weight allocation of the accumulated user profile can be expressed as the following formula:

$$x_t = y_t/(z_t)^2$$

where $(z_t)^2$ is the standard deviation of the accumulated user profile during at least two days while $x_t$ is the weight of the accumulated user profile during at least two days and $y_t$ is the number of usage logs during at least two days.

Generally, the accumulated user profile means the collected usage log browsed during a certain time slot in the past to reflect the user browsing preference during that time slot and is assigned a larger weight according to the foregoing formula. The weight of the user default information is expressed as the following formula:

$$\Sigma_k \epsilon_Q M_k^2 G_k^2$$

wherein $\Sigma_{k=1} M_k = 1$ and $M_k > 0$

The initial preference set and input by the user's interface is $G_k$, and a smaller weight $M_k$ is given to the initial preference using least squares. The foregoing reasons are that the initial preference is calculated according to the user default. However, the accumulated user profile is tracked according to the browsing preference during a certain time slot and is alterable when specific occasions take place. For example, during an information technology exhibition, the demand of technology-based news is increases, and thus the weight assigned to the accumulated user profile is heavier than the weight assigned to the user default information to reflect the reality. However, the weights assigned to the both can also be the same, and the present invention is not limited thereto. The accumulated user profile and the default information are then fused to obtain a new threshold value to assist the user setting a plurality of widgets 18. The preference for a specific occasion corresponds to one of the widgets, and thus the set widget is automatically recommended and displayed on the liquid crystal display 11 during a specific time slot. As a result, when the routing node module 13 is linked to the Internet, the multi-media content corresponding to the preference tracking is decrypted by the digital signal processor 12 and displayed on the liquid crystal display 11 through the widgets.

Preferably, the routing node module 13 collects at least one usage log through the antenna 14, and the digital signal processor 12 processes the usage log to generate an accumulated user profile. The accumulated user profile is given by a weighted value which equals or is greater than the user default information in the user default unit 17 coupled to the digital signal processor 12 to serve a fusion purpose to set the plurality of widgets predetermined in the module so that the liquid crystal display 11 is capable of displaying the multi-media content played by the plurality of widgets at a time slot.

Preferably, the routing node module 13 collects a plurality of usage logs through the antenna 14, and the digital signal processor 12 processes the usage logs to generate an accumulated user profile. The accumulated user profile then is fused with user default information in a user default unit 17 coupled to the digital signal processor 12 to set a plurality of widgets so that the widgets replaces, according to the accumulated user profile, the multi-media content that is originally determined to be played upon the user default information.

Preferably, the routing node module 13 further comprises a proxy server to receive the usage log.

Figure 2:
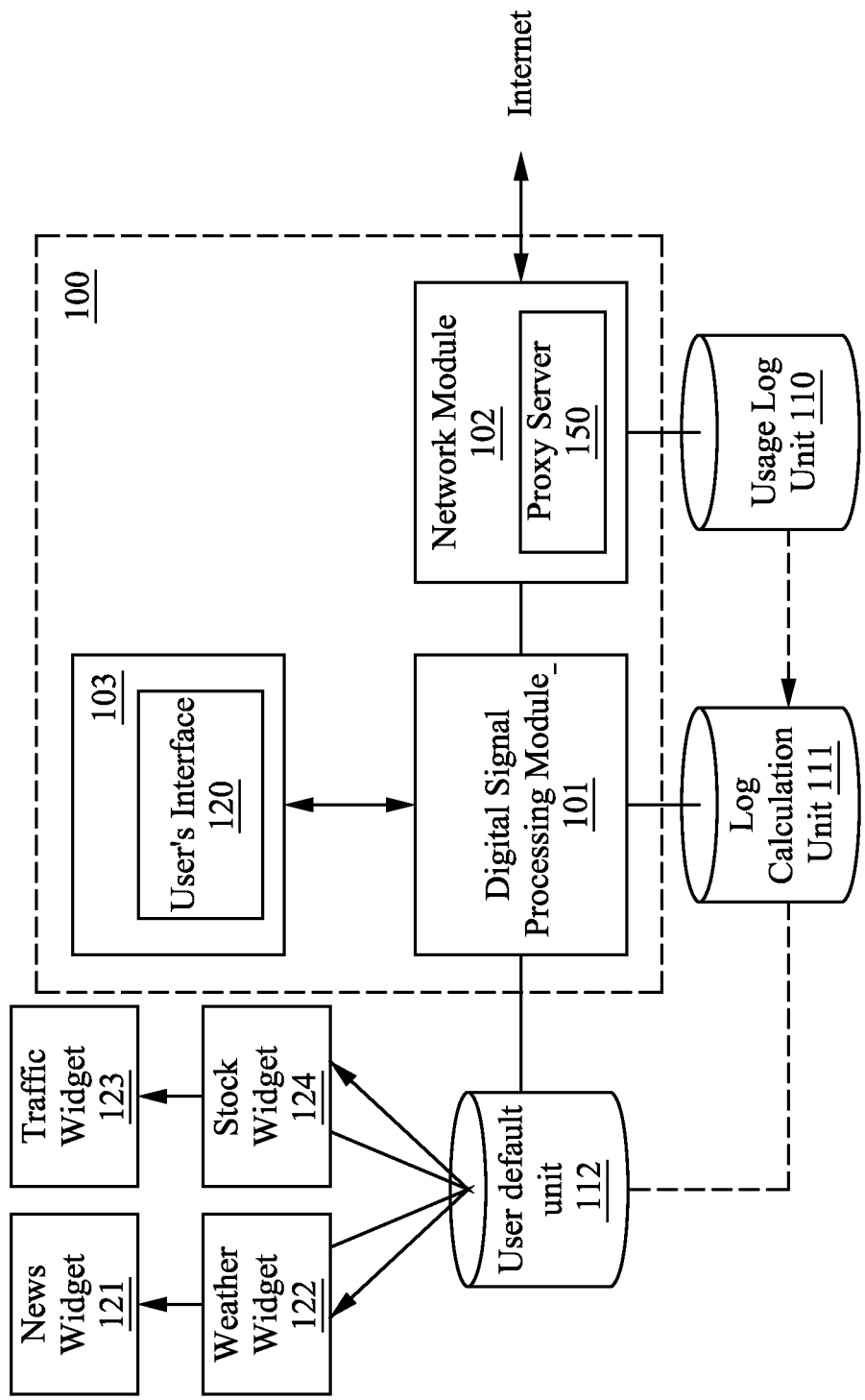
FIG. 2 is a system diagram according to another embodiment of the present invention.

Please refer to FIG. 2, which is a system diagram according to another embodiment of the present invention. The adaptive infotainment device 100 comprises a digital signal processing module 101, a network module 102, a display unit 103, a usage log unit 110, a log calculation unit 111 and a user default unit 112. The digital signal processing module 101 is capable of processing multi-media data. The network module 102 is coupled to the digital signal processing module 101 and is linked to the Internet to receive the multi-media data. In the present embodiment, the network module 102 may comprise a proxy server 150 installed therein to link to the Internet. The display unit 103, preferably a liquid crystal display (LCD), is coupled to the digital signal processing module 101. The usage log unit 110 is coupled to the network module 102 to store at least one usage log. In general, the usage log can be stored anywhere. Preferably, the usage log is stored at the network service provider or at the user end so as to be accessed by the adaptive infotainment device 100. The log calculation unit 111 is coupled to the usage log unit 110 and the digital signal processing module 101 to collect and calculate the usage log to provide an information preference within a time slot. The usage log is collected and calculated at a time slot determined by the user. For example, as the user usually browses information on the web from seven to nine in the evening, the usage log unit 110 only collects and calculates the usage log during that time slot. The user default information stored in the user default unit 112 is fused with the information preference within a time slot through the digital signal processing module 101 so that the display unit 103 displays the multi-media data played by a plurality of widgets 121-124 pre-installed in the device such as a news widget 121, a weather widget 122, a traffic widget 123 and a stock widget 124 according to fusion.

Furthermore, the multimedia contents, which are originally played upon user, default information and correspond to the plurality of widgets 121-124 are capable of being replaced and displayed on the display unit 103 in accordance with the information preference within a specific time. For example, according to the user default information, the multi-media content corresponding to the news widget 121 comprises financial news to have priority. However, according to the information preference as the user profile in a specific time slot, health news is more helpful to the user. Therefore, the user's interface 120 is updated to recommend more health news to replace the originally determined financial news for real-time display. Moreover, since the log calculation unit 111 collects and calculates the usage log previously browsed by the user, the initial preference settings may have to be updated for a while. Preferably, in the present invention, when the user default information stored in the user default unit 112 is different from the previously browsed information preference within a time slot, the user's interface (not shown) indicates the previously desired usage log so that the search time can be significantly reduced when the user would like to browse the frequently viewed multi-media data. Moreover, the user can also adapt the user default information stored in the user default unit 112 using the user's interface on the display unit 103. In this case, the user does not decide the multi-media to be browsed by merely relying on the information preference generated from the log calculation unit 111. Instead, the user may keep the right of browsing the multi-media data.

In view of the above, the present invention provides an adaptive infotainment device capable of learning user's network behaviors and adapting preference settings according thereto so as to make it more convenient for the user to browse the data on the Internet.

Please refer to FIG. 3, which is a system diagram showing an adaptive infotainment device linked to the Internet to collect user network behavior and usage log according to the present invention. In FIG. 3, the adaptive infotainment device 300 can be assisted by an Internet service provider 400 to provide home information and/or entertainments. The usage log can be set and stored on the web site of the Internet service provider 400 or the user's own website (not shown). Accordingly, the adaptive infotainment device 300 is capable of searching paths through the Internet to transmit packets and provides the function of accessing nodes so as to collect the usage log via the Internet. The usage log is tracked and transmitted by the adaptive infotainment device 300 to the web server 500.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An adaptive infotainment device, comprising:
a display unit;
a processing module coupled to the display unit to decrypt and process at least one multi-media content; and
a network module coupled to the processing module to receive the multi-media content and capable of selecting paths and accessing nodes;
wherein the network module collects at least one usage log to be processed by the processing module to generate an accumulated user profile to be fused with user default information stored in a user default unit coupled to the processing module to generate at least one threshold value so that the display unit is capable of displaying the processed multi-media content according to the threshold value;
wherein the accumulated user profile and user default information are each assigned weights for determining the threshold value according to a data fusion algorithm;
wherein the weight of the accumulated user profile is determined by the equation $x_t = y_t/(Z_t)^2$, where $x_t$ is the weight of the accumulated user profile during a time period, $y_t$ is the number of usage logs during the time period, and $(Z_t)^2$ is the standard deviation of the accumulated user profile during the time period; and
wherein the weight of the user default information weights determined by the equation $\Sigma_{k \in Q} M_k^2 G_k^2$, where $\Sigma_{k=1} M_k = 1$ and $M_k > 0$, $G_k$ is the initial preference set input by user interface, and $M_k$ is a smaller weight given to the initial preference using least squares.

2. The adaptive infotainment device as recited in claim 1, wherein the display unit is a liquid crystal display and the processing module is a digital signal processor.

3. The adaptive infotainment device as recited in claim 1, wherein the network module collects the usage log using at least one antenna unit.

4. The adaptive infotainment device as recited in claim 1, wherein the usage log is stored in a usage log register.

5. The adaptive infotainment device as recited in claim 1, wherein the accumulated user profile is stored in a log calculation unit.

6. The adaptive infotainment device as recited in claim 1, wherein the accumulated user profile is stored according to a pre-determined time slot.

7. The adaptive infotainment device as recited in claim 1, further comprising a reading medium for storing a plurality of widgets, and the plurality of widgets are capable of playing the multi-media content on the liquid crystal display.

8. An adaptive infotainment device, comprising:
a liquid crystal display;
a digital signal processor coupled to the liquid crystal display to decrypt and process at least one multi-media content; and
a routing node module coupled to the digital signal processor to receive the multi-media content;
wherein the routing node module collects at least one usage log to be processed by the digital signal processor to generate an accumulated user profile to be fused with user default information in a user default unit coupled to the digital signal processor to set a plurality of widgets preset in the reading medium by providing different weights according to a data fusion algorithm so that the liquid crystal display is capable of displaying the multi-media content played by the plurality of widgets;
wherein the weight of the accumulated user profile is determined by the equation $x_t = y_t/(Z_t)^2$, where $x_t$ is the weight of the accumulated user profile during a time period, $y_t$ is the number of usage logs during the time period, and $(Z_t)^2$ is the standard deviation of the accumulated user profile during the time period;
wherein the weight of the user default information weight is determined by the equation $\Sigma_{k \in Q} M_k^2 G_k^2$, where $\Sigma_{k=1} M_k = 1$ and $M_k > 0$, $G_k$ is the initial preference set input by user interface, and $M_k$ is a smaller weight given to the initial preference using least squares.

9. The adaptive infotainment device as recited in claim 8, wherein the routing node module, which further comprises a proxy server to receive the usage log collects the usage log using at least one antenna unit.

10. The adaptive infotainment device as recited in claim 8, further comprising a reading medium for storing the plurality of widgets replaced the multi-media content according to the accumulated user profile, and the multi-media content that was previously determined to be played according to the user default information.

* * * * *